(12) United States Patent
Li et al.

(10) Patent No.: US 11,630,600 B2
(45) Date of Patent: Apr. 18, 2023

(54) DEVICE AND METHOD FOR CHECKING REGISTER DATA

(71) Applicant: REALTEK SEMICONDUCTOR CORPORATION, Hsinchu (TW)

(72) Inventors: Zan Li, Suzhou (CN); Pan-Ting Jiang, Suzhou (CN)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 17/139,376

(22) Filed: Dec. 31, 2020

(65) Prior Publication Data

US 2021/0240382 A1   Aug. 5, 2021

(30) Foreign Application Priority Data

Feb. 3, 2020   (CN) .......................... 202010079091.8

(51) Int. Cl.
*G06F 3/00* (2006.01)
*G06F 3/06* (2006.01)

(52) U.S. Cl.
CPC .......... *G06F 3/0655* (2013.01); *G06F 3/0604* (2013.01); *G06F 3/0673* (2013.01)

(58) Field of Classification Search
None
See application file for complete search history.

(56) References Cited

U.S. PATENT DOCUMENTS 5,349,249 A * 9/1994 Chiang ................... H01L 23/57
711/E12.099
2010/0287426 A1  11/2010 Kanai et al.
(Continued)

FOREIGN PATENT DOCUMENTS

CN   101354666 A   1/2009
CN   101419563 A   4/2009
CN   101826038 A   9/2010
(Continued)

OTHER PUBLICATIONS

OA letter of the counterpart CN application (appl. No. 202010079091.8) mailed on Mar. 30, 2022. Summary of the OA letter: Claims 1~14 are rejected under Chinese Patent Act §22-3 as being unpatentable over US2010/0287426A1 in view of common techniques in this technical field.

*Primary Examiner* — Midys Rojas
(74) *Attorney, Agent, or Firm* — WPAT, P.C

(57) ABSTRACT

Disclosed is a register data checking device including: an original parity-bit generator generating an original parity bit according to register data to be inputted into a register, and then writing the original parity bit to the register; and a detecting circuit. The detecting circuit includes: a scanning circuit reading the register data and the original parity-bit from the register; an arbitrator enabling the scanning circuit when an access status of the register is free, and thereby forwarding the register data and the original parity bit from the scanning circuit; at least one controlled parity-bit generator generating a controlled parity bit according to the register data from the arbitrator when the access status of the register is free; and at least one parity-bit checking circuit comparing the original parity bit from the arbitrator with the controlled parity bit when the access status is free, and thereby outputting a check result.

15 Claims, 5 Drawing Sheets

(56) References Cited

U.S. PATENT DOCUMENTS

2017/0228177 A1\* 8/2017 Kodama .............. G06F 3/0679
2020/0387426 A1\* 12/2020 Jain ..................... G06F 11/327

FOREIGN PATENT DOCUMENTS

| CN | 102779079 A | 11/2012 |
| CN | 104092629 A | 10/2014 |
| CN | 104597807 A | 5/2015 |
| CN | 102929836 B | 6/2015 |
| CN | 104932954 A | 9/2015 |
| CN | 105045672 A | 11/2015 |
| CN | 105976870 A | 9/2016 |
| CN | 106648968 A | 5/2017 |
| CN | 108363638 A | 8/2018 |

\* cited by examiner

DEVICE AND METHOD FOR CHECKING REGISTER DATA

BACKGROUND OF THE INVENTION

1. Field of the Invention

The present disclosure relates to a device and method for checking data, especially to a device and method for checking register data.

2. Description of Related Art

An electronic system uses memory circuits to store/keep a lot of configuration information that is used as configuration parameters for system operation. The memory circuits usually include a static random-access memory (SRAM) and registers. The data in SRAM should be read out by a memory control and access circuit before they are provided for the electronic system, but the data in registers can be provided for the electronic system directly without any additional read operation. Therefore, registers are often used for storing configuration information in practice, and the correctness of the configuration information stored in the registers should be guaranteed to the electronic system.

In a circumstance that a device has been used for many years or operates in an adverse environment, a bit-error problem of memory circuits of the device may occur. Since erroneous configuration information may lead to system operation failure, the device needs a technique capable of quickly checking whether the configuration information is correct and locating the address of a memory circuit storing erroneous configuration information, and thus a user can timely correct the erroneous configuration information and prevent system failure.

Most data checking techniques are developed for checking the correctness of SRAM data, and developed for Field Programmable Gate Array (FPGA) circuits. The system of a general FPGA circuit usually keeps the duplicate of configuration information of registers for error detection, or uses a complicated checking circuit and stores multi-bit cyclic redundancy check (CRC) data for error correction. The above-mentioned manners for FPGA circuits consume a lot of resources, and are not suitable for an application specific integrated circuit (ASIC) or the like characterized by small circuit area and/or low power consumption.

SUMMARY OF THE INVENTION

An object of the present disclosure is to provide a device and method for checking register data. The device and method are suitable for an integrated circuit characterized by small circuit area and/or low power consumption.

An embodiment of the device of the present disclosure includes an original parity-bit generator and a detecting circuit. The original parity-bit generator is configured to generate an original parity bit according to register data to be inputted into a register, and then writing the original parity bit to the register. The detecting circuit includes a scanning circuit, an arbitrator, at least one controlled parity-bit generator, and at least one parity-bit checking circuit. The scanning circuit is configured to read the register data and the original parity-bit from the register according to a register address. The arbitrator is configured to disable the scanning circuit on condition that a status signal is indicative of an access status of the register being busy; and the arbitrator is also configured to enable the scanning circuit on condition that the status signal is indicative of the access status of the register being free, and thereby forward the register data and the original parity-bit from the scanning circuit to the at least one controlled parity-bit generator and at least one parity-bit checking circuit respectively. The at least one controlled parity-bit generator is configured to generate a controlled parity bit according to the register data from the arbitrator on condition that the status signal is indicative of the access status of the register being free. The at least one parity-bit checking circuit is configured to compare the original parity bit from the arbitrator with the controlled parity bit on condition that the status signal is indicative of the access status of the register being free, and thereby output a check result indicating whether the register data come from the register are erroneous.

An embodiment of the register data checking method of the present disclosure includes the following steps: generating an original parity bit according to register data to be inputted into a register, and then writing the original parity bit to the register; generating a next original parity bit according to next register data to be inputted into a next register, and then writing the next original parity bit to the next register; reading the register data and the original parity-bit from the register according to a register address; generating a controlled parity bit according to the register data come from the register; comparing the controlled parity bit with the original parity bit, and thereby outputting a check result indicating whether the register data come from the register are erroneous; updating the register address and thereby obtaining a next register address; reading the next register data and the next original parity bit from the next register according to the next register address; generating a next controlled parity bit according to the next register data come from the next register; and comparing the next controlled parity bit with the next original parity bit, and thereby outputting a next check result indicating whether the next register data come from the next register are erroneous.

These and other objectives of the present invention will no doubt become obvious to those of ordinary skill in the art after reading the following detailed description of the preferred embodiments that are illustrated in the various figures and drawings.

DETAILED DESCRIPTION OF THE PREFERRED EMBODIMENTS

The present disclosure includes a device and method for checking register data. The device and method use a known/self-developed parity check technique capable of generating a parity bit to check register data, and are suitable for an integrated circuit (e.g., Application Specific Integrated Circuit (ASIC)) characterized by small circuit area and/or low power consumption. For example, the device itself is included in an ASIC. Since the parity check technique can be known in this technical field, its detail is omitted here.

Figure 1:
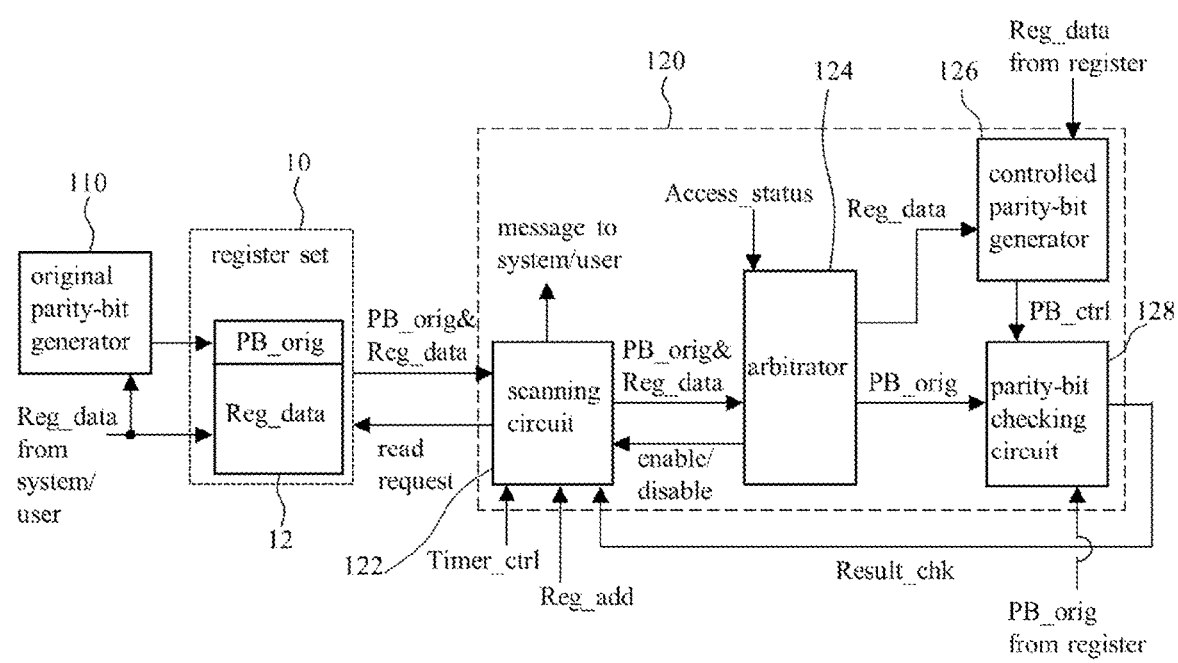
FIG. 1 shows an embodiment of the register data checking device of the present disclosure.

FIG. 1 shows an embodiment of the register data checking device of the present disclosure. The register data checking device 100 of FIG. 1 includes an original parity-bit generator 110 and a detecting circuit 120. The original parity-bit generator 110 is configured to generate an original parity bit (PB_orig) according to register data (Reg_data) to be inputted into a register 12 of a register set 10, and is configured to write the original parity bit to the register 12, wherein the register data to be inputted into the register 12 is provided by a system or a user. The detecting circuit 120 includes a scanning circuit 122, an arbitrator 124, a controlled parity-bit generator 126, and a parity-bit checking circuit 128, and is configured to check whether the register data come from the register 12 is corresponding to the original parity bit and thereby indicate whether the register data come from the register 12 is erroneous. The said register set 10 can be included in the register data checking device 100, or be an external circuit outside the register data checking device 100.

Please refer to FIG. 1. The scanning circuit 122 is configured to read the register data and the original parity bit from the register 12 according to a register address (Reg_add), wherein the register address can be generated and updated with a known/self-developed address generator (not shown), and the address generator can be a part of the register data checking device 100 or an external circuit outside the register data checking device 100. The arbitrator 124 is configured to disable the scanning circuit 122 on condition that a status signal (Access_status) is indicative of an access status of the register 12 being busy (e.g., when a user is accessing the register 12), so as to prevent a conflict arisen from simultaneous access operations. The arbitrator 124 is also configured to enable the scanning circuit 122 on condition that the status signal is indicative of the access status of the register being free, and to receive the register data and the original parity-bit from the scanning circuit 122 and then forward them. The controlled parity-bit generator 126 is configured to generate a controlled parity bit (PB_ctrl) according to the register data from the arbitrator 124 on condition that the status signal is indicative of the access status of the register 12 being free. The parity-bit checking circuit 128 is configured to compare the original parity bit from the arbitrator 124 with the controlled parity bit on condition that the status signal is indicative of the access status of the register 12 being free, and thereby output a check result (Result_chk) indicating whether the register data come from the register 12 (e.g., come from the register 12 directly, or come from the register 12 via the arbitrator 124) are erroneous. As mentioned in the preceding paragraph, the original parity bit is generated according to the register data to be inputted to the register 12 by a system or a user while the controlled parity bit is generated according the register data come from the register 12, and logically the two parity bits should be the same; if the check result indicates that the two parity bits are different, it shows that the register data come from the register 12 are probably erroneous and a bit-error problem of the register 12 may occur. Register data of the other registers of the register set 10 can be verified in the above-mentioned manner Please refer to FIG. 1. In this embodiment, the parity-bit checking circuit 128 outputs the check result to the scanning circuit 122 in a circumstance that the scanning circuit 122 is enabled; accordingly, the scanning circuit 122 can output a message according to the check result when the check result indicates that the controlled parity bit is different from the original parity bit, and thereby suggest that a system or a user updates the register data stored in the register 12 according to the message, wherein the message usually includes the aforementioned register address. In an alternative embodiment, the scanning circuit 122 outputs the message after a predetermined amount of registers have been scanned, which means that the message includes one or more check results of the registers being abnormal. In the embodiment of FIG. 1, the scanning speed and/or the scanning cycle of the scanning circuit 122 is fixed or adjustable. The said scanning speed is indicative of a unit scan time for scanning one register; in other words, the unit scan time is equal to the minimum time for scanning one register plus a time interval (e.g., a time interval greater than zero). The said scanning cycle is indicative of a total scan time for scanning a plurality of registers (e.g., all registers in the register set 10); in other words, the total scan time is equal to the minimum time for scanning the plurality of registers plus a time interval (e.g., a time interval greater than zero). In an exemplary implementation, the register data checking device 100 includes or uses at least one timer (not shown) to provide at least one control signal (Timer_ctrl) for the scanning circuit 122, and thereby controls at least one of the scanning speed and the scanning cycle; in addition, the aforementioned address generator can update the register address and provide the updated register address as a next register address according to the trigger of the at least one control signal.

Please refer to FIG. 1. As mentioned in the preceding paragraph, the scanning circuit 122 is disabled on condition that the register 12 is busy; however, the embodiment of FIG. 1 can optionally check whether register data stored in a register (e.g., register 12) is erroneous even though the scanning circuit 122 is disabled. In detail, when the register data stored in the register 12 is read, the status signal indicates that the access status of the register 12 is busy, and this makes the arbitrator 124 disables the scanning circuit 122; meanwhile, the controlled parity-bit generator 126 can generate the controlled parity bit according to the register data from the register 12 instead of the arbitrator 124; afterwards, the parity-bit checking circuit 128 can compare the original parity bit from the register 12 instead of the arbitrator 124 with the controlled parity bit and thereby output the check result indicating whether the register data from the register 12 is erroneous. The check result can be provided for a system or a user for determining whether the register data stored in the register 12 should be updated.

Figure 2:
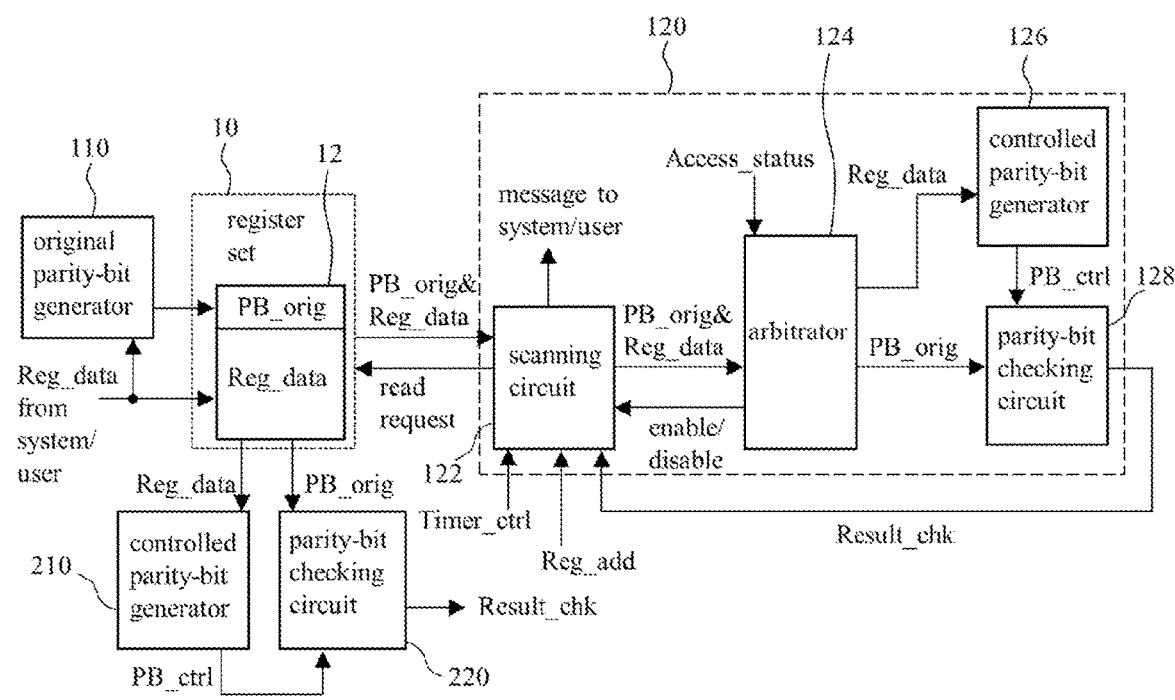
FIG. 2 shows another embodiment of the register data checking device of the present disclosure.

FIG. 2 shows another embodiment of the register data checking device of the present disclosure. In comparison with the embodiment of FIG. 1, the register data checking device 200 of FIG. 2 further includes a controlled parity-bit generator 210 and a parity-bit checking circuit 220. The controlled parity-bit generator 210 is coupled to the register 12, and configured to generate the controlled parity bit according to the register data from the register 12 when the register data stored in the register 12 is read, that is to say when the access status of the register 12 is busy. The parity-bit checking circuit 220 is coupled to the register 12, and configured to compare the original parity bit from the register 12 with the controlled parity bit from the controlled parity-bit generator 210 and thereby output the check result. Because of the controlled parity-bit generator 210 and the parity-bit checking circuit 220, the controlled parity-bit generator 126 of FIG. 2 does not need to receive the register data directly from the register 12, and the parity-bit checking circuit 128 of FIG. 2 does not need to receive the original parity bit directly from the register 12. Since those having ordinary skill in the art can appreciate the detail and modification of the embodiment of FIG. 2 according to the disclosure of the embodiment of FIG. 1, repeated and redundant description is omitted here.

Figure 3:
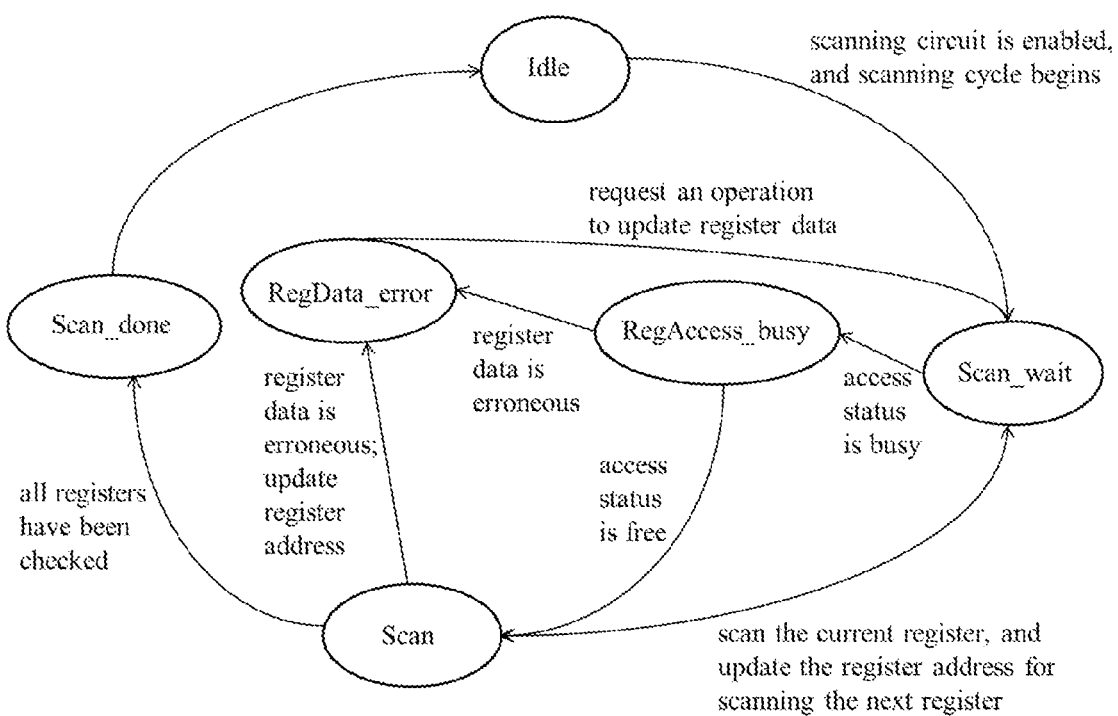
FIG. 3 shows an example of the operation states of the detecting circuit of FIG. 1/2.

FIG. 3 shows an example of the operation states of the detecting circuit 120 of FIG. 1/2. As shown in FIG. 3, the operation states of the detecting circuit 120 includes: an idle state (Idle); a scan wait state (Scan_wait); a register access busy state (RegAccess_busy); a register data error state (RegData_error); a scan state (Scan); and a scan completion state (Scan_done). In a circumstance that the detecting circuit 120 is in the idle state, if the scanning circuit 122 is enabled and a scanning cycle begins, the detecting circuit 120 enters the scan wait state; in the scan wait state, if an access status of a target register specified by a register address is busy, the detecting circuit 120 enters the register access busy state; in the register access busy state, if the check result indicates that the accessed register data of the target register is erroneous, the detecting circuit 120 enters the register data error state, then requests a system or a user to update the register data of the target register, and then returns to the scan wait state; in the register access busy state, if the access status of the target register becomes free, the detecting circuit 120 enters the scan state; in the scan wait state, if the access status of the target register is free, the detecting circuit 120 enters the scan state; in the scan state, the detecting circuit 120 inspects the target register, and updates the register address if the check result indicates that the register data of the target register is erroneous and then enters the register data error state; in the scan state, the detecting circuit 120 inspects the target register, and updates the register address if the check result indicates that the register data of the target register is correct and then treats a next register as the target register for inspection; in the scan state, if the detecting circuit 120 completes inspections of all the registers, the detecting circuit 120 enters the scan completion state and then returns to the idle state.

Figure 4:
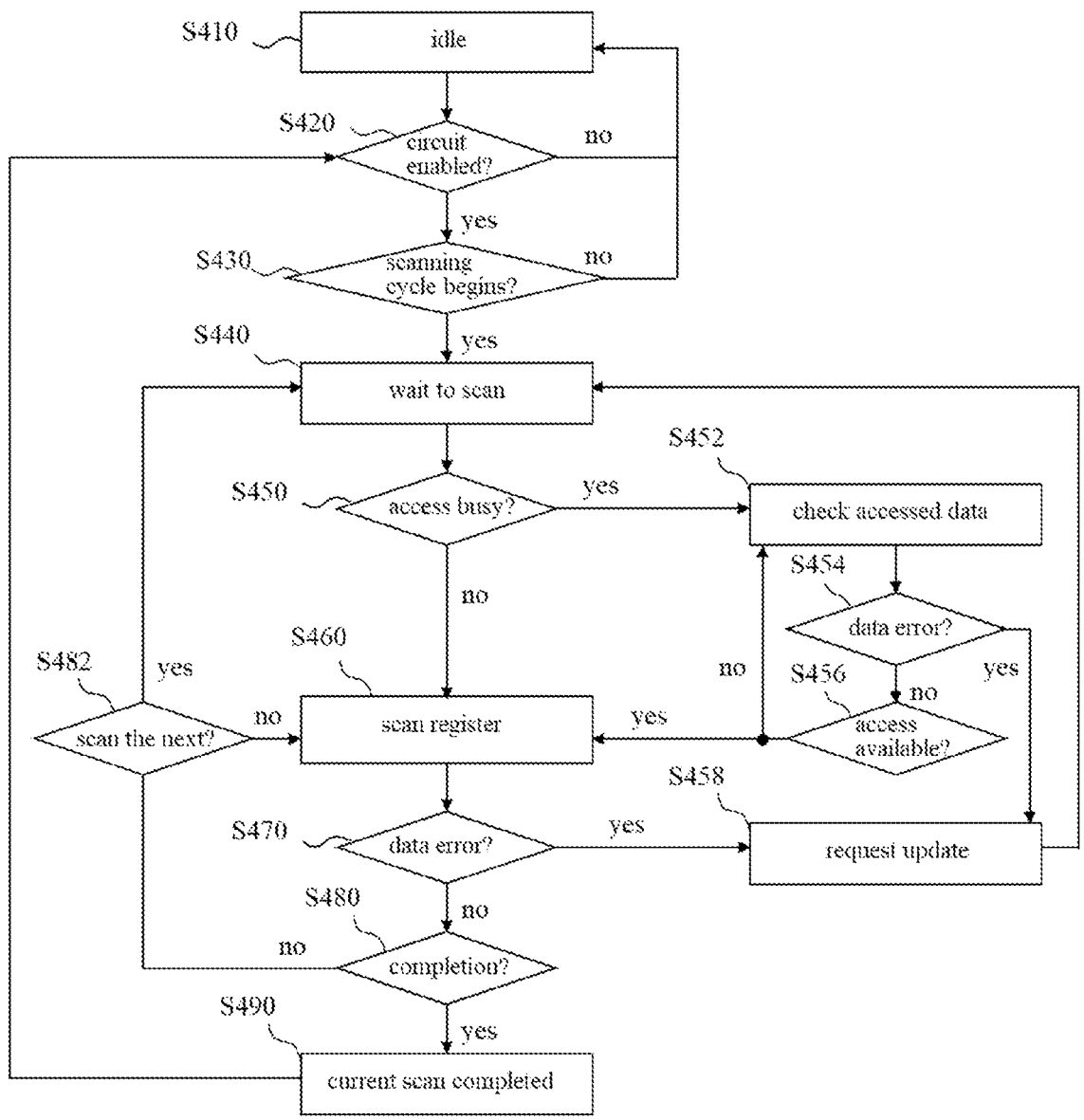
FIG. 4 shows an example of the operation flow of the detecting circuit of FIG. 1/2.

FIG. 4 shows an example of the operation flow of the detecting circuit of FIG. 1/2. The operation flow includes the following steps:
S410: idle.
S420: determining whether the scanning circuit 122 is enabled.
S430: determining whether a scanning cycle begins.
S440: waiting to scan a register.
S450: determining whether the access status of the register is busy.
S452: checking the register data being accessed.
S454: determining whether the register data is erroneous.
S456: determining whether the access status of the register is still busy.
S458: determining that the register data is erroneous, and requesting an operation to update the register data.
S460: scanning the register.
S470: determining whether the register data is erroneous, and updating the register address if the register data is found erroneous.
S480: determining whether all registers have been checked.
S482: determining whether it is ready to check a next register.
S490: completing the scan in the current scanning cycle.
Since the detail of each step in FIG. 4 is found in the preceding paragraph, repeated and redundant description is omitted here.

Figure 5:
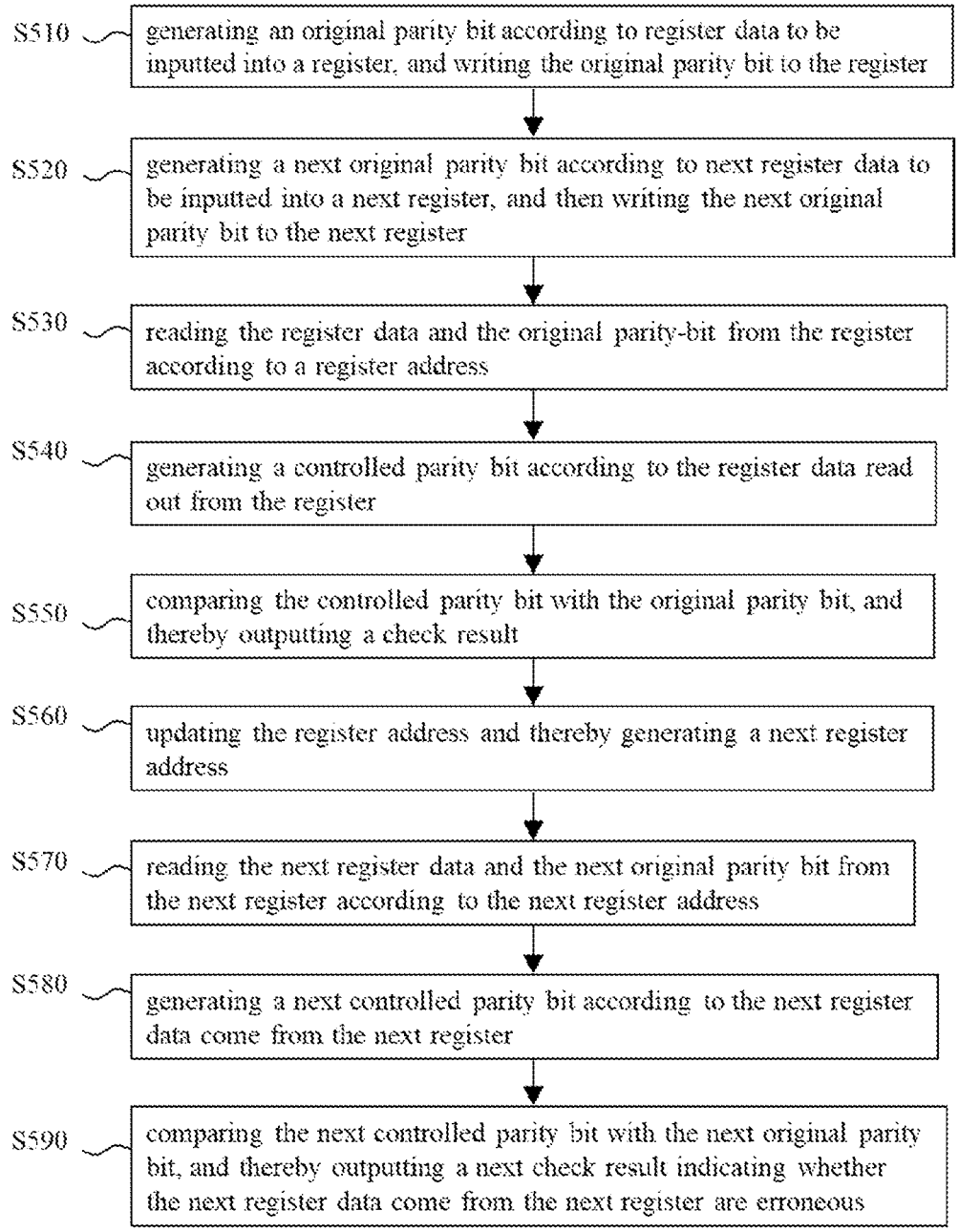
FIG. 5 shows an embodiment of the register data checking method of the present disclosure.

FIG. 5 shows an embodiment of the register data checking method of the present disclosure. This embodiment includes the following steps:

S510: generating an original parity bit according to register data to be inputted into a register, and then writing the original parity bit to the register.
S520: generating a next original parity bit according to next register data to be inputted into a next register, and then writing the next original parity bit to the next register.
S530: reading the register data and the original parity-bit from the register according to a register address.
S540: generating a controlled parity bit according to the register data come from the register.
S550: comparing the controlled parity bit with the original parity bit, and thereby outputting a check result indicating whether the register data come from the register are erroneous.
S560: updating the register address and thereby obtaining a next register address.
S570: reading the next register data and the next original parity bit from the next register according to the next register address.
S580: generating a next controlled parity bit according to the next register data come from the next register.
S590: comparing the next controlled parity bit with the next original parity bit, and thereby outputting a next check result indicating whether the next register data come from the next register are erroneous.

Since those of ordinary skill in the art can refer to the embodiments of FIGS. 1-4 to appreciate the detail and the modification of the embodiment of FIG. 5, which implies that some or all of the features of the embodiments of FIGS. 1-4 can be applied to the embodiment of FIG. 5 in a logical way, repeated and redundant description is omitted here.

It should be noted that people of ordinary skill in the art can selectively use some or all of the features of any embodiment in this specification or selectively use some or all of the features of multiple embodiments in this specification to implement the present invention as long as such implementation is practicable, which implies that the way to realize the present invention can be flexible.

To sum up, the device and method for checking register data of the present disclosure have no need to consume a lot of circuit area because of the adoption of the parity check technique. Furthermore, the device and method can optionally enable/disable the detecting circuit and optionally adjust the scanning speed/scanning cycle, and thereby prevent a conflict caused by simultaneous access operations and adjust the power consumption.

The aforementioned descriptions represent merely the preferred embodiments of the present invention, without any intention to limit the scope of the present invention thereto. Various equivalent changes, alterations, or modifications based on the claims of present invention are all consequently viewed as being embraced by the scope of the present invention.

What is claimed is:
1. A register data checking device, comprising:
an original parity-bit generator configured to: generate an original parity bit according to initial register data to be inputted into a target register of a register set including a plurality of registers, and then write the original parity bit to the target register; and
a detecting circuit including a scanning circuit, an arbitrator, at least one controlled parity-bit generator, and at least one parity-bit checking circuit, wherein:
the scanning circuit is coupled between the register set and the arbitrator, and is configured to read stored register data and the original parity bit from the target register according to a register address for the target register using a read request;

the arbitrator is configured to disable the scanning circuit from issuing the read request when a status signal indicates the target register is busy;

the arbitrator is configured to enable the scanning circuit to issue the read request when the status signal indicates the target register is free, and thereby forward the stored register data from the scanning circuit to the at least one controlled parity-bit generator and forward the original parity bit from the scanning circuit to the at least one parity-bit checking circuit;

the at least one controlled parity-bit generator is configured to generate a controlled parity bit according to the stored register data from the arbitrator when the status signal indicates the target register is free; and the at least one parity-bit checking circuit is configured to compare the original parity bit from the arbitrator with the controlled parity bit when the status signal indicates the target register is free, and thereby output a check result indicating whether the stored register data come from the target register are erroneous.

2. The register data checking device of claim 1, wherein when the status signal indicates the target register is busy, the at least one controlled parity-bit generator is configured to generate the controlled parity bit according to the stored register data from the target register when the stored register data is read out from the target register; and then the at least one parity-bit checking circuit is configured to compare the original parity bit from the target register and the controlled parity bit and thereby output the check result.

3. The register data checking device of claim 2, wherein the at least one controlled parity-bit generator includes a first controlled parity-bit generator and a second controlled parity-bit generator; the first controlled parity-bit generator is coupled to the arbitrator, and configured to generate the controlled parity bit according to the stored register data from the arbitrator; and the second controlled parity-bit generator is coupled to the target register, and configured to generate the controlled parity bit according to the stored register data from the target register.

4. The register data checking device of claim 3, wherein the at least one parity-bit checking circuit includes a first parity-bit checking circuit and a second parity-bit checking circuit; the first parity-bit checking circuit is coupled to the arbitrator, and configured to compare the original parity bit from the arbitrator with the controlled parity bit generated by the first controlled parity-bit generator and thereby output the check result; and the second parity-bit checking circuit is coupled to the target register, and configured to compare the original parity bit from the target register with the controlled parity bit generated by the second controlled parity-bit generator and thereby output the check result.

5. The register data checking device of claim 1, wherein at least one of a scanning speed and a scanning cycle of the scanning circuit is adjustable.

6. The register data checking device of claim 5, further comprising: at least one timer configured to provide at least one control signal for the scanning circuit to control at least one of the scanning speed and the scanning cycle.

7. The register data checking device of claim 1, wherein after the stored register data and the original parity bit are read out by the scanning circuit, the scanning circuit reads next stored register data and a next original parity bit from a next target register according to a next register address.

8. The register data checking device of claim 7, further comprising: an address generator configured to provide the register address for the scanning circuit, and to provide the next register address by updating the register address according to pace of the scanning circuit.

9. The register data checking device of claim 1, wherein when the check result indicates that the original parity bit is different from the controlled parity bit, the at least one parity-bit checking circuit outputs a message according to the check result to suggest that a system or a user updates the stored register data according to the message.

10. The register data checking device of claim 1, wherein the register data checking device is included in an application specific integrated circuit (ASIC).

11. The register data checking device of claim 1, wherein the scanning circuit is configured to receive the check result; and when the check result indicates that the controlled parity bit is different from the original parity bit, the scanning circuit is configured to output a message to suggest that a system or a user updates the stored register data.

12. A register data checking method, comprising:
generating a first original parity bit according to first initial register data to be inputted into a first register of a register set including a plurality of registers, and then writing the first original parity bit to the first register;

generating a second original parity bit according to second initial register data to be inputted into a second register of the register set, and then writing the second original parity bit to the second register;

when a first status signal indicates the first register is not accessed, using a first read request to read first stored register data and the first original parity bit from the first register according to a first register address for the first register;

generating a first controlled parity bit according to the first stored register data come from the first register when the first status signal indicates the first register is not accessed;

comparing the first controlled parity bit with the first original parity bit when the first status signal indicates the first register is not accessed, and thereby outputting a first check result indicating whether the first stored register data come from the first register are erroneous;

updating the first register address and thereby obtaining a second register address;

when a second status signal indicates the second register is not accessed, using a second read request to read second stored register data and the second original parity bit from the second register according to the second register address for the second register;

generating a second controlled parity bit according to the second stored register data come from the second register when the second status signal indicates the second register is not accessed; and comparing the second controlled parity bit with the second original parity bit when the second status signal indicates the second register is not accessed, and thereby outputting a second check result indicating whether the second stored register data come from the second register are erroneous.

13. The register data checking method of claim 12, further comprising: when the first check result indicates that the first original parity bit is different from the first controlled parity bit, updating the first register address and thereby providing the second register address; and when the first check result indicates that the first original parity bit is identical to the first controlled parity bit, updating the first register address according to a control signal and thereby provides the second register address.

14. The register data checking method of claim 12, further comprising: when the first check result indicates that the first original parity bit is different from the first controlled parity bit, outputting a message according to the first check result to suggest that a system or a user updates the first stored register data according to the message.

15. The register data checking method of claim 12, further comprising:
- when the first status signal indicates the first register is being accessed, forbidding reading the first stored register data and the first original parity bit from the first register; and
- when the second status signal indicates the second register is being accessed, forbidding reading the second stored register data and the second original parity bit from the second register.

* * * * *